United States Patent [19]

Gibson

[11] Patent Number: 4,766,996

[45] Date of Patent: Aug. 30, 1988

[54] ROLLERS WITH ORIENTED FIBER REINFORCEMENT AND METHOD

[75] Inventor: Christopher M. Gibson, Fountain Valley, Calif.

[73] Assignee: Garrett Aerospace, Los Angeles, Calif.

[21] Appl. No.: 537,908

[22] Filed: Sep. 30, 1983

[51] Int. Cl.$^4$ ............................................. B65G 13/02
[52] U.S. Cl. .................................. 198/780; 198/843; 29/132
[58] Field of Search .............. 198/382, 780, 842, 843, 198/577, 781; 152/313, 318; 29/110, 132; 264/108

[56] References Cited

U.S. PATENT DOCUMENTS

| | | | |
|---|---|---|---|
| 1,903,038 | 3/1933 | Fujii | 29/132 |
| 2,342,556 | 2/1944 | Rockoff . | |
| 2,393,953 | 2/1946 | Bacon | 29/132 |
| 2,621,141 | 12/1952 | Obitz | 29/128 |
| 2,801,461 | 8/1957 | Kusters | 29/120 |
| 2,804,678 | 9/1957 | Rockoff | 29/121.8 |
| 3,232,409 | 2/1966 | Pierson et al. | 198/781 X |
| 3,460,222 | 8/1969 | Mitchell, Jr. | 29/132 |
| 3,468,997 | 9/1969 | Pickels | 264/108 |
| 3,588,978 | 6/1971 | Brafford | 29/132 |
| 3,635,158 | 1/1972 | Budinger | 29/120 |
| 3,707,752 | 1/1973 | Brafford et al. | 29/132 |
| 3,710,469 | 1/1973 | Kitazawa | 29/125 |
| 3,730,794 | 5/1973 | Ross | 29/132 |
| 3,741,504 | 6/1973 | Alberti et al. | 198/780 |
| 3,815,197 | 6/1974 | Sukenik | 29/132 |
| 3,852,862 | 12/1974 | Sukenik | 29/132 |
| 3,853,526 | 12/1974 | Hochart | 29/132 |
| 3,853,677 | 12/1974 | Kai | 29/132 |
| 4,242,783 | 1/1981 | Watanabe et al. | 29/132 |
| 4,244,781 | 1/1981 | Heckman | 29/132 |
| 4,389,361 | 6/1983 | Messerly . | |
| 4,470,498 | 9/1984 | Lund et al. | 198/382 |

FOREIGN PATENT DOCUMENTS

| | | | |
|---|---|---|---|
| 513684 | 6/1955 | Canada | 29/132 |
| 2242874 | 3/1975 | France . | |
| 305604 | 2/1933 | Italy | 29/132 |
| 2023767 | 1/1980 | United Kingdom . | |

OTHER PUBLICATIONS

Paper entitled "Short Fiber Reinforced Elastomers" by L. A. Gofttler and K. S. Shen.

Primary Examiner—Robert J. Spar
Assistant Examiner—Jonathan D. Holmes
Attorney, Agent, or Firm—Leslie S. Miller; James W. McFarland; David B. Abel

[57] ABSTRACT

A roller for use in the cargo bay of an aircraft is disclosed which is constructed with chopped fiber strands incorporated into the rubber and oriented in a substantially circumferential direction around the hub of the roller to provide reinforcement to the rubber portion of the roller.

10 Claims, 2 Drawing Sheets

ROLLERS WITH ORIENTED FIBER REINFORCEMENT AND METHOD

BACKGROUND OF THE INVENTION

Rubber rollers are used in a variety of conveyor transport systems to move freight from one location to another. Such systems typically use a number of rubber rollers extending slightly above the transport surface and powered by electric motors to move freight from one end of the transport surface to the other. One of the most demanding applications of rubber rollers is that of cargo rollers in the cargo hold of an aircraft.

Cargo rollers in the cargo bay of an aircraft are required to be capable of moving heavy loads quickly and efficiently. Such cargo rollers must have a high surface coefficient of friction to prevent slippage when cargo contacts the roller, thereby resulting in the cargo roller going from no load to full load, for example from zero to 500 pounds, virtually instantaneously.

The result of such severe load requirements is that rollers in the cargo bay of aircraft have had a relatively short life in the past, with the surface of the rubber roller degrading and wearing down relatively quickly, requiring expensive and time-consuming replacement of the rubber rollers in the aircraft cargo bay. Since a typical passenger aircraft has about 40 rollers per aircraft, and a typical cargo aircraft has about 80 rollers per aircraft, it may be appreciated that frequent replacement of the rollers in the cargo bay has been a major maintenance problem.

One possible solution to premature cargo roller wear is to use a harder rubber compound. Unfortunately, this has adverse affects in that the surface coefficient of friction is substantially reduced as rubber hardness is increased, resulting in unsatisfactory performance of the harder rubber rollers. In addition, another problem experienced using different rubber formulatons is chunking, where chuncks of the rubber portion of the cargo roller break off resulting in dynamic destruction of the cargo roller in a random and unpredictable manner. Thus, it is apparent that reformulation of the rubber compound used in manufacturing the rollers is not the solution to the problem of premature wear in cargo rollers.

In addition, several other factors exist in the design of rollers for aircraft cargo bays. It is desireable that the rubber compound used have not only good abrasion resistance and tear resistance, but that it have good weather and oil resistance as well. Since the temperature range at which aircraft cargo bays may be loaded or unloaded may include fairly cold temperatures, i.e. temperatures in the −20° to −40° F. region, as well as storage temperatures of up to 165° F., the rollers must be useable over a fairly wide temperature range. Finally, since the rollers are to be used on board aircraft, it is desireable that the rubber compound used have at least some degree of resistance to flammability. In short, there has been a particularly strong demand by airlines for the development of a cargo bay roller with not only good performance characteristics, but also a high degree of resistance to wear resulting in an extended operating life of the rollers.

SUMMARY OF THE INVENTION

The premature wear problems associated with the use of rubber rollers in aircraft cargo bays are solved by the present invention through the incorporation of specifically oriented chopped fiber strands into the rubber used in manufacturing the cargo roller. The present invention allows the use of a rubber compound having desireable physical characteristics and requires only a single additional step to incorporate the chopped fiber strands into the rubber.

The chopped fiber strands are incorporated into uncured rubber in a two roll rubber mill, which is commonly used to mix the rubber formula. By using the technique of the present invention, the chopped fiber strands are incorporated into the uncured rubber with the fibers in a substantially parallel orientation. Such parallel orientation of the fibers results in greatly superior rubber strength in the direction of fiber orientation. The reinforced uncured rubber is then cut to predetermined size and bonded to a metal roller hub in a curing press with the fibers in the rubber oriented in a circumferential direction about the metal roller hub.

The resulting rubber roller has been found to be substantially more wear-resistant than existing rubber rollers in aircraft cargo bay applications. In fact, a roller manufactured utilizing the principles of the present invention has an expected lifetime greater than ten times the lifetime of previous non-reinforced rubber rollers. Other than the increased lifetime of the reinforced rubber roller, there are substantially no differences in operational characteristics of the reinforced rubber roller as compared to previous non-reinforced rubber rollers. Although the incorporation of chopped fiber strands increases the hardness of the rubber material, by compensating in the formulation of the uncured rubber, the final hardness of the fiber-reinforced rubber roller is close enough to the hardness of the non-reinforced rubber roller to result in a substantially identical coefficient of friction and operational capability.

The cost of producing the fiber-reinforced rubber roller is only minimally greater than the cost of producing non-reinforced rubber rollers, since only a single additional step is required to introduce the chopped fiber strands into the uncured rubber formula. The greatly increased lifetime of the fiber-reinforced rubber rollers quickly compensates for the slight increase in cost in manufacture of the roller. Therefore, it may be appreciated that a fiber-reinforced rubber roller constructed according to the present invention represents a substantial gain in the art at minimal cost, while providing the same high degree of performance required in applications as aircraft cargo bay rollers.

DESCRIPTION OF THE DRAWINGS

These and other advantages of the present invention are best understood through reference to the drawings, in which.

DETAILED DESCRIPTION OF THE PREFERRED EMBODIMENT

Rubber is typically blended by a rubber manufacturer to meet the performance requirements of the purchaser, and is supplied to the purchaser in uncured rough slabs typically weighing 5-100 pounds. Rubber for use in aircraft cargo rollers must have good weather resistance, oil resistance, and abrasion and tear resistance, as well as being at least somewhat burn-resistant. The elastomer used for roller applications is generally synthetic rubber, such as neoprene, nitrile, or urethane.

The rubber formulation includes other components often making up a substantial portion of the formulation. The rubber is formulated with the weight of the elastomer being designated as 100 parts, and the weight of other components being specified as percentage parts of the total weight of the elastomer used. Typically carbon black is added to give strength and a reinforcing effect to the compound, oil is added as an extender for the elastomer, and zinc oxide, stearic acid, and an accelerator are used to control the rate and degree of vulcanization. Other components may be added to improve aging characteristics, reduce fatigue cracking, and to act to improve fire-retardant properties. The formulation of rubber for roller applications is thus well known in the art, and is done by rubber companies such as Goodyear, Firestone, and B.F. Goodrich.

Since under the present invention chopped fiber strands are to be added to the rubber, which will act to increase the hardness of the rubber, the rubber formula should be specified to have a hardness less than the desired final hardness of the rubber roller. For example, while rubber rollers without fiber reinforcement typically have a hardness of between 70 and 75 on the ASTM D 2240 type A (hereinafter Type A) durometer scale, the rubber formula for use with chopped fiber strands may typically have a hardness of between 60 and 70 on the Type A Scale in the preferred embodiment.

Figure 1:
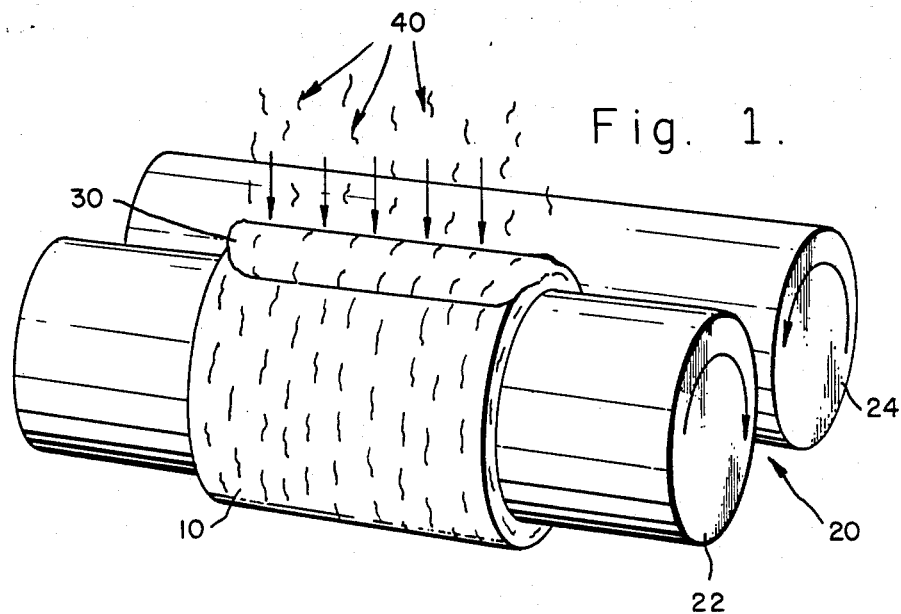
FIG. 1 illustrates the incorporation of chopped fiber strands into uncured rubber on a two roll rubber mill.

As stated earlier, specially blended rubber is generally supplied in uncured slabs each weighing 5-100 pounds. The specially blended rubber 10 is fed into a two roll rubber mill 20 having a faster steel roller 22 and a slower steel roller 24. Since the rollers 22, 24 rotate at different surface speeds towards each other, a high shear condition results that aids in the mixing of the rubber formulation 10. As the rubber 10 comes out of the bottom of the two roll mill 20, it is taken by the operator and reinserted into the two roll mill 20 between the rollers 22, 24, thus resulting in a continuous roll of rubber 10 around the faster roller 22, as shown in FIG. 1. Since the rubber slab is sized to have slightly more rubber than needed to make a band around the faster roller 22, a portion of the rubber 10 will pile up in a rubber bank 30 atop and between the rollers 22, 24.

As the rubber 10 is run on the two roll mill 20, it will increase in temperature and become more pliable, a step which must be followed before the fiber may be incorporated into the rubber. Typically, the operator may cut or slash the rubber 10 around the roller 22, pull the rubber from the bottom of the roller 22 outwardly and reinsert it into the top of the two roll mill 20. This process is called "cutting from side-to-side", is well known in the art, and in fact is used by rubber manufacturers to mix the rubber formulation. Another technique used by manufacturers to mix the rubber is "cross-milling", which consists of cutting the rubber around the roller, rolling it up, and reintroducing it to the two roll mill end first, thusly milling the rubber in a direction perpendicular to the original direction. Cross-milling and cutting from side-to-side both may be used before fiber is added to the rubber, when the rubber is mill freshened.

The chopped fiber 40 to be incorporated into the rubber 10 is an aromatic polyamide such as Kevlar or Nomex or a polyethylene terephthalate such as Dacron in the preferred embodiment, with a fiber length from three-sixteenths of an inch to one-half inch, with the amount of fiber to be incorporated measured as a percentage of the elastomer in the rubber formula. The diameter of the fiber typically may be from 0.00075 inch to 0.005 inch. Polyamids such as nylon can also be used for the fibers, as can natural fibers such as hemp or cotton. Kevlar, Nomex, or Dacron are preferred because of their superior fiber strength. Typically, from 0.5 to 3 parts of fiber per hundred parts of elastomer are used.

The length of the fiber must be at least three-sixteenths of an inch to provide sufficient reinforcement properties, and not greater than one-half inch long, since longer fibers are hard to blend in. The amount of fiber incorporated in the rubber formula must be sufficient to provide adequate reinforcement and yet is limited by the hardness of the resulting fiber-reinforced rubber. For example, for rubber formulas having a hardness of between 60 and 70 on the Type A Scale, if greater than 3 parts of fiber per 100 parts of elastomer are added, the hardness of the resulting fiber-reinforced rubber will be too high, resulting in the roller having a low surface coefficient of friction and a tendency to slip. Typically, a final hardness of 75 on the Type A Scale is the upper limit of hardness for rubber rollers in aircraft cargo bay applications.

While the mill is running, the fiber strands 40 are sprinkled by the operator of the two roll mill 20 onto the rubber bank 30 which has built up on the faster roller 22. By then allowing the two roll mill 20 to run and shear the rubber 10, the fibers 40 will be dispersed in the rubber 10 with a substantially parallel orientation which is circumferential around the faster roll 22. It is very important to note that while cutting from side-to-side may be done after the fiber is added, cross-milling may not be done. The reason for not cross-milling is that if cross-milling is done after the fiber is added, the fiber orientation in the rubber will not be substantially parallel.

After the fiber 40 is incorporated in the rubber 10, the band of rubber 10 may be slashed and removed from the two-roll mill 20. It may be noted that the thickness of the rubber 10, which is determined by the two roll mill 20, should be only slightly greater than the actual thickness needed for construction of the rubber roller.

Figure 2:
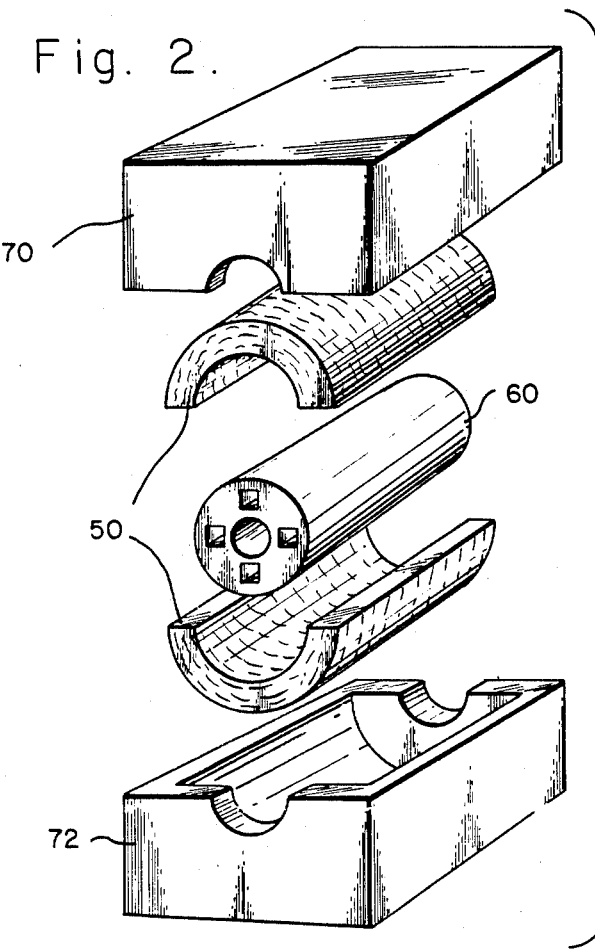
FIG. 2 is an exploded perspective view of the manufacture of a fiber-reinforced rubber roller in a curing press using the fiber-reinforced rubber mixed on the two roll mill of FIG. 1.

The reinforced rubber is then cut into preformed pads 50 as shown in FIG. 2, each of which will extend halfway around the completed rubber roller. The rubber pads 50 are cut so that the fiber orientation will be circumferential around the roller.

Figure 3:
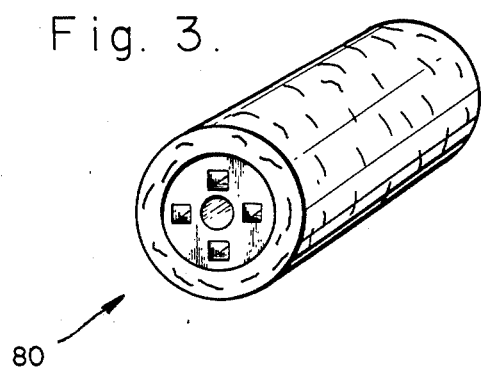
FIG. 3 is a perspective view of the completed fiber-reinforced rubber roller made in the curing press of FIG. 2.

A metal roller hub 60 about which the rubber pads 50 will be placed may be coated with an adhesive to ensure that the rubber pads 50 will adhere to the hub 60. The rubber pads 50 and the hub 60 are then placed into the curing mold having a top half portion 70 and a bottom half portion 72, as shown in FIG. 2. The curing mold uses a pressure varying from 600 to 1000 psi, and a curing temperature of approximately 310° F. for about 35 minutes to cure the rubber. The completed rubber roller 80, shown in FIG. 3, thus has a rubber covering with the fibers extending in a substantially circumferential orientation.

It is important to note that if the fibers in the roller 80 are not substantially circumferentially oriented, the roller 80 will not have superior wear resistance. In fact, if non-oriented fibers are used one of two results is inevitable: either so much fiber is used to obtain a sufficient degree of wear resistance that the hardness of the roller is so high that it will have virtually no gripping power at all, resulting in a totally useless roller, or there will be insufficient circumferential fiber orientation to increase wear resistance, resulting in a rubber roller which wears out too quickly.

Figure 4:
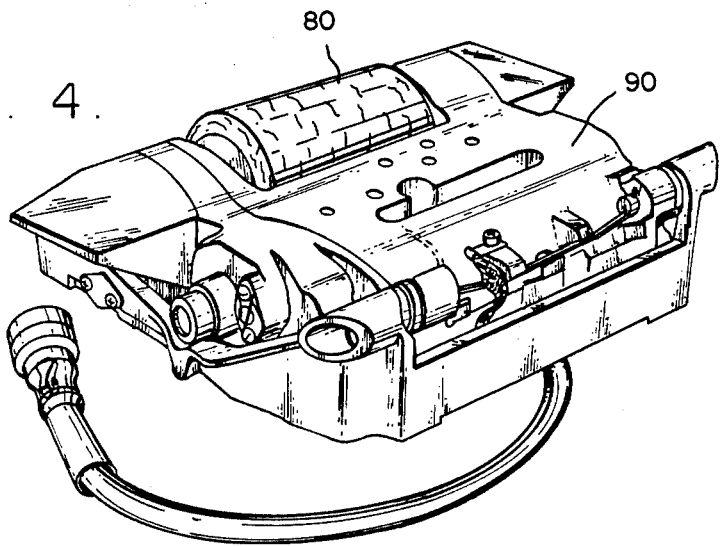
FIG. 4 shows the roller of FIG. 3 mounted for operation in a motorized cargo roller assembly.

The rubber roller 80 may then be inserted into a typical motorized drive unit 90, as shown in FIG. 4. The motorized drive unit 90 is inserted into the cargo deck of the aircraft cargo bay, and the roller 80 may be operated either to load or unload cargo from the aircraft. It has been found that a cargo roller 80 constructed according to the principles of the present invention provides a useful life which is greater than ten times the useful life of a rubber roller not containing oriented fiber reinforcement. This substantial increase in the useful life of the rubber roller 80 is obtained at relatively minimal increased cost per roller, making the roller of the present invention a highly desireable product.

Thus, it may be appreciated that the rubber roller 80 of the present invention presents the advantage of greatly increased wear resistance and a dramatically extended lifetime at a minimal cost increase, while still presenting desireable physical characteristics. Weather resistance, oil resistance, and flammability characteristics of a roller 80 constructed according to the principles of the present invention are generally at least as good as non-reinforced rubber rollers, and also result in reduced maintenance and replacement time by the aircraft operator. The present invention is therefore a substantial improvement in the art, while affording virtually no drawbacks.

What is claimed is:

1. A roller for tractional driving of loads, comprising: a cylindrical hub adapted to be rotatably driven; and an elastomeric surface layer fixedly installed on said cylindrical hub, said elastomeric surface layer containing fiber strands dispersed therein in substantially circumferential orientation around said cylindrical hub, said elastomeric surface layer having a hardness not greater than 75 on the ASTM D 2240 type A durometer scale.

2. A roller as defined in claim 1, wherein said elastomeric surface layer is formulated using an elastomer selected from the group consisting of neoprene, nitrile and urethane, and said elastomer has a hardness of between 60 and 70 on the ASTM D 2240 type A durometer scale.

3. A roller as defined in claim 1, wherein said fiber strands are between three-sixteenths of an inch and one-half inch in length, and said fiber strands weigh between 0.5% and 3% of the weight of the elastomer in said elastomeric surface layer.

4. A roller as defined in claim 1, wherein said fiber strands are selected from the group consisting of Kevlar, Nomex, and Dacron.

5. A roller for tractional driving of loads, comprising: a cylindrical hub adapted to be rotatively driven; an elastomeric surface layer bonded to the cylindrical outer surface of said cylindrical hub, said elastomeric layer for tractional contact with said load; and a plurality of fiber strands uniformly dispersed throughout said elastomeric layer in substantially circumferential orientation around said cylindrical hub, such that said elastomeric surface layer maintains a hardness not greater than 75 on the ASTM D 2240 type A durometer scale throughout the useful life of said roller.

6. A roller as defined in claim 5, wherein said elastomeric layer is made of an elastomeric compound having a hardness of between 60 and 70 on the ASTM D 2240 Type A durometer scale, and the dispersion of said fiber strands in said elastomeric layer raises the hardness of said layer to between 70 and 75 on the ASTM D 2240 type A durometer scale.

7. A roller for tractional driving of loads, comprising: a hub having a cylindrical outer surface, said hub being adapted to be rotatively driven; a cylindrical elastomeric layer bonded to said cylindrical outer surface of said hub, said elastomeric layer having incorporated therein a plurality of fiber strands not greater than one half inch in length, said fiber strands being distributed throughout said cylindrical elastomeric layer in substantially circumferential orientation around said cylindrical outer surface of said hub, said cylindrical elastomeric layer having a uniform hardness throughout.

8. A roller as defined in claim 7, wherein said elastomeric layer is bonded to said hub under heat and pressure to cure said elastomeric layer, and an adhesive is used to bond said elastomeric layer to said hub.

9. A roller for the tractional driving of loads comprising: a cylindrical hub adapted to be rotatively driven; an elastomeric surface layer adhesively bonded to the cylindrical outer surface of said cylindrical hub, said elastomeric surface layer being formulated using an elastomer selected from the group consisting of neoprene, nitrile, and urethane; and a plurality of fiber strands dispersed within said elastomeric surface layer in substantially circumferential orientation around said cylindrical hub, said fiber strands being between three-sixteenths of an inch and one-half inch in length and said fiber strands being selected from the group consisting of Kevlar, Nomex, and Dacron, said fiber strands weighing between 0.5% and 3% of the weight of said elastomer in said elastomeric surface layer, and wherein said elastomeric surface layer containing said fiber strands has a hardness not greater than 75 on the ASTM D 2240 type A durometer scale.

10. A roller for tractional driving of loads comprising: a cylindrical hub adapted to be rotatively driven; an elastomeric surface layer adhesively bonded to said cylindrical hub, said elastomeric layer for tractional contact with loads; and a means for reducing the wear at the contact surface of said elastomeric surface layer, said means comprising a plurality of discrete, short fibers dispersed within said elastomeric surface layer substantially aligned circumferentially with respect to said cylindrical hub, said elastomeric surface layer including said means for reducing wear having a hardness of between 70 and 75 on the ASTM D 2240 type A durometer scale.

* * * * *